(12) United States Patent
Kawashima

(10) Patent No.: US 7,163,261 B2
(45) Date of Patent: Jan. 16, 2007

(54) AUTOMOBILE SEAT

(75) Inventor: Yoshihito Kawashima, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 10/959,060

(22) Filed: Oct. 7, 2004

(65) Prior Publication Data
US 2005/0077763 A1    Apr. 14, 2005

(30) Foreign Application Priority Data
Oct. 8, 2003  (JP)  ............... 2003-349331
Aug. 25, 2004 (JP)  ............... 2004-245553

(51) Int. Cl.
B60N 2/42    (2006.01)
(52) U.S. Cl. ............... 297/214.14; 297/214.12
(58) Field of Classification Search ........... 297/216.12, 297/216.14, 214.12, 214.14
See application file for complete search history.

(56) References Cited

U.S. PATENT DOCUMENTS

| | | | | |
|---|---|---|---|---|
| 3,802,737 A | * | 4/1974 | Mertens | 297/216.2 |
| 5,884,968 A | * | 3/1999 | Massara | 297/216.12 |
| 6,022,074 A | * | 2/2000 | Swedenklef | 297/216.14 |
| 6,024,406 A | * | 2/2000 | Charras et al. | 297/216.14 |
| 6,340,206 B1 | * | 1/2002 | Andersson et al. | 297/216.14 |
| 6,523,892 B1 | * | 2/2003 | Kage et al. | 297/216.13 |
| 6,789,846 B1 | * | 9/2004 | Humer et al. | 297/216.12 |
| 2002/0195846 A1 | * | 12/2002 | Masuda et al. | 297/216.12 |

FOREIGN PATENT DOCUMENTS

| | | |
|---|---|---|
| JP | 2001-39194 | 2/2001 |
| JP | 2001-163097 | 6/2001 |
| JP | 2002-274240 | 9/2002 |

* cited by examiner

Primary Examiner—Peter M. Cuomo
Assistant Examiner—Joe Edell
(74) Attorney, Agent, or Firm—Wenderoth, Lind & Ponack, L.L.P.

(57) ABSTRACT

An automobile seat includes a seat cushion frame, a side frame, and a seat back frame mounted on the side frame to be rotatable within a limited angle. An elastic member and a guide portion having an elastic member holding portion are mounted on the side frame and the seat back frame. The seat back frame is normally fixed to the side frame with the elastic member held in the holding portion, but when a load greater than a predetermined value is inputted from behind, a lower portion of the seat back frame is pushed rearward by a lumbar part of a seat occupant to thereby deform the elastic member, which in turn leaves the holding portion and moves rearward along the guide portion, thus causing the seat back frame to rotate with respect to the side frame and causing the headrest to move forward.

3 Claims, 15 Drawing Sheets

BEFORE OPERATION

AFTER OPERATION

Fig. 8A
Fig. 8B
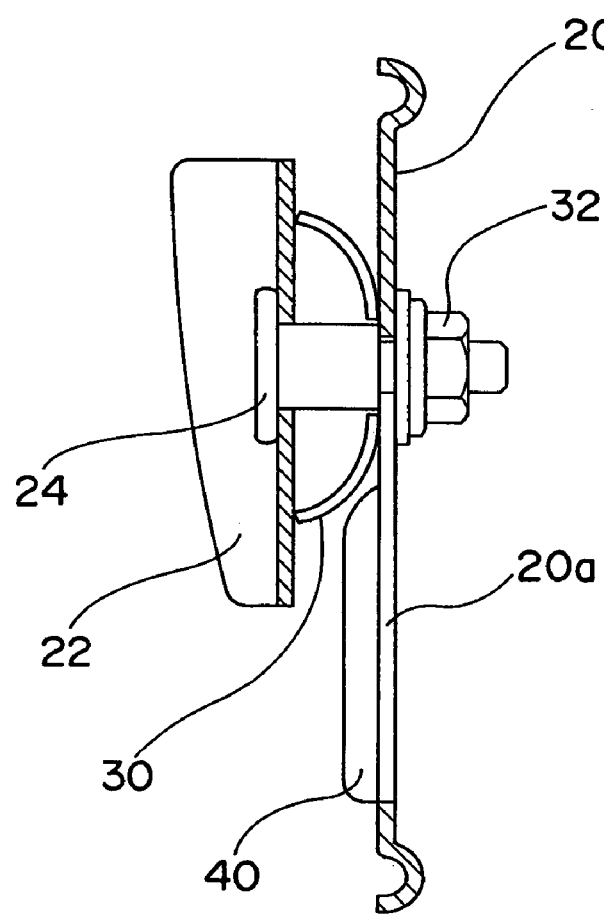
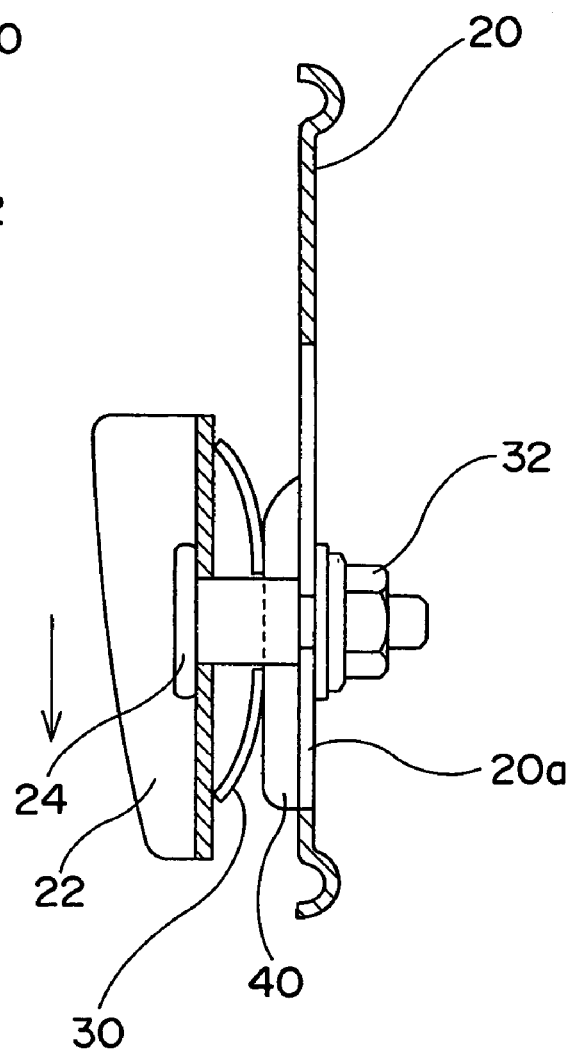

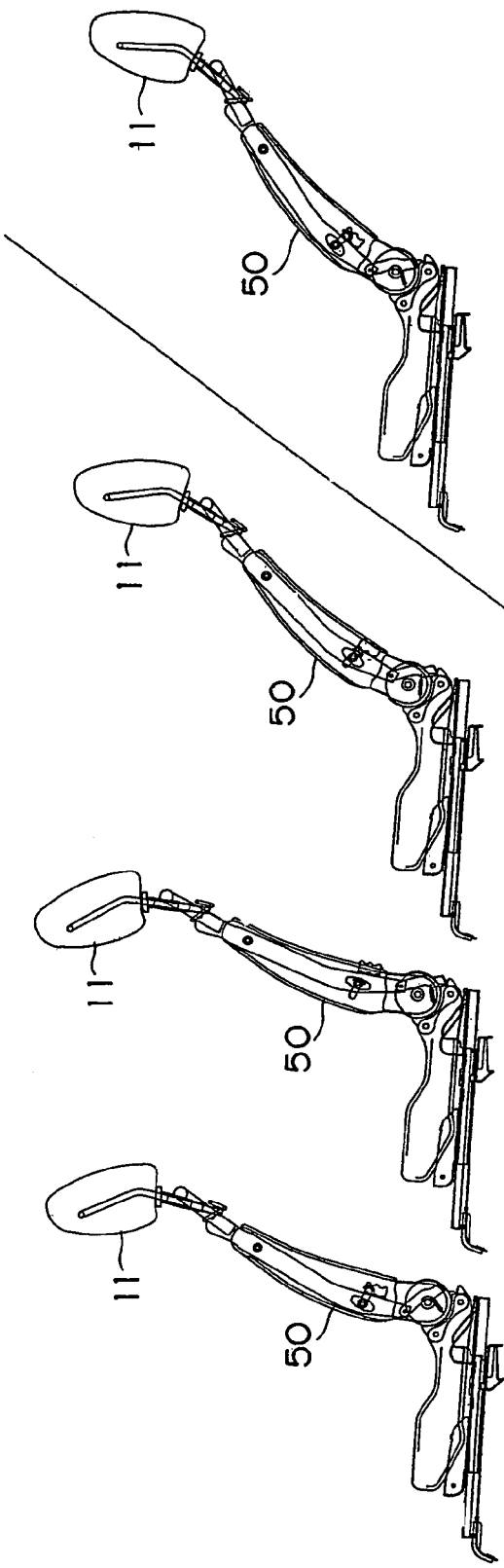
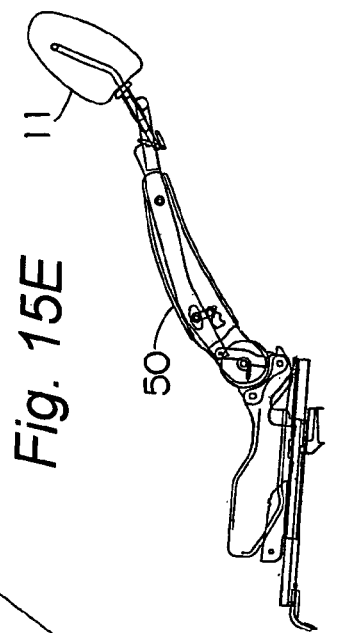
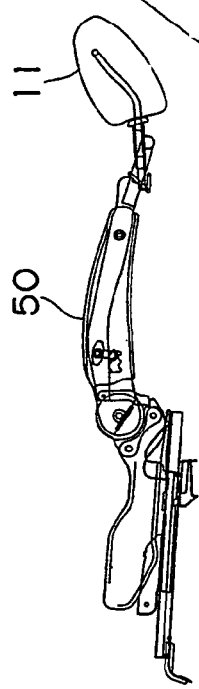
Fig. 15A  Fig. 15B  Fig. 15C  Fig. 15D  Fig. 15E  Fig. 15F

AUTOMOBILE SEAT

BACKGROUND OF THE INVENTION

1. Field of the Invention

The present invention relates to an automobile seat capable of preventing a seat occupant from suffering a whiplash injury when an automotive vehicle has come into a rear-end collision.

2. Description of the Related Art

Automobile seats generally have a headrest mounted on an upper portion of a seat back. When a user sits on a seat, a predetermined clearance is present between the user's head and the headrest, but when an automobile vehicle has come into a rear-end collision, the user's body moves forwards, while the user's head remains back. Accordingly, a load is applied to the user's neck, resulting in a whiplash injury.

It is possible to reduce the clearance between the user's head and the headrest to minimize the injury. In this case, however, the user's head is often brought into contact with the headrest even in the normal sitting condition, and even a slight movement of the head causes the head to interfere with the headrest, making the user uncomfortable.

A headrest pivotally mounted on a seat back, connected to a pressure portion, and always biased rearwards by a coil spring has been hitherto proposed. When a rear-end collision occurs, a load inputted to the pressure portion moves the headrest forwards against a biasing force of the coil spring. According to this arrangement, the headrest that has been brought into contact with the head is immediately returned to its original position after the rear-end collision and, hence, a load is also applied to the user's neck (see, for example, Document 1).

Another headrest has been proposed, having a mechanism that acts, in the event of a rear-end collision, to move the headrest forwards and hold the headrest at a forward position (see, for example, Document 2 or 3).

Document 1: Japanese Laid-Open Patent Publication No. 2001-39194

Document 2: Japanese Laid-Open Patent Publication No. 2001-163097

Document 3: Japanese Laid-Open Patent Publication No. 2002-274240

The automobile seat as disclosed in Document 2 employs a ratchet mechanism for holding the headrest at the forward position in the event of the rear-end collision. The ratchet mechanism cannot allow the headrest to return to its original position after the rear-end collision. Because the headrest is held at the forward position after the rear-end collision, the impact on the head is reduced to some extent, but it is still insufficient.

The automobile seat as disclosed in Document 3 similarly employs a ratchet mechanism, but this ratchet mechanism is provided with a releasing means that is operable to return the headrest to its original position after the rear-end collision. However, the mechanism is complicated and is hence costly.

SUMMARY OF THE INVENTION

The present invention has been developed to overcome the above-described disadvantages.

It is accordingly an objective of the present invention to provide an automobile seat of a simple construction capable of moving the headrest forwards in the event of a rear-end collision and returning it to its original position after the rear-end collision, wherein a desired clearance is ensured between the head and the headrest in the normal condition. This automobile seat causes the headrest to return to the original position with a resistance, making it possible to reduce a load on the neck.

In accomplishing the above and other objectives, the automobile seat according to the present invention includes a seat cushion frame, a side frame mounted on the seat cushion frame, and a seat back frame mounted on the side frame so as to be rotatable within a limited angle. An elastic member is mounted on one of the side frame and the seat back frame, while a guide portion having a holding portion for holding the elastic member is formed on the other of the side frame and the seat back frame. The seat back frame is fixed to the side frame in a normal sitting condition in which the elastic member is held in the holding portion. If a load greater than a predetermined value is inputted from behind, a lower portion of the seat back frame is pushed by a lumbar part of a seat occupant upon a rearward movement of the seat occupant to thereby deform the elastic member, which in turn leaves the holding portion and moves rearwards along the guide portion, thus causing the seat back frame to rotate with respect to the side frame and causing the headrest to move forwards.

It is preferred that the elastic member be a spring member, and the holding portion has a shape complementary to a shape of a portion of the spring member that is held by the holding portion. The guide portion is formed in the side frame, and the spring member is mounted on a lower portion of the seat back frame.

Conveniently, the guide portion is a guide groove formed in the side frame, and the holding portion is a recess formed in the vicinity of the guide groove.

The automobile seat may include a guide member interposed between the spring member and the holding portion, wherein the holding portion has a shape complementary to a shape of a portion of the guide member that is held by the holding portion.

Conveniently, the spring member is a coned disc spring. The coned disc spring may have a plurality of radially outwardly extending protrusions.

Preferably, the guide portion includes a guide groove formed in the side frame and two ridges formed on respective sides of the guide groove, while the holding portion includes two recesses formed on respective sides of the guide groove, wherein the elastic member has two protrusions formed therewith that engage in the two recesses, respectively.

Advantageously, a load at the time when the elastic member begins to move rearwards from the holding portion is adjustable.

The automobile seat may include a pressure plate mounted on a lower portion of the seat back frame, wherein where the load greater than the predetermined value is inputted from behind, a load produced by the rearward movement of the seat occupant is transmitted to the pressure plate.

After the headrest has moved forwards upon rotation of the seat back frame, the elastic member is returned to the holding portion by applying a load to the headrest or the seat back frame.

According to the present invention, the seat back frame is fixed to the side frame in the normal sitting condition by holding the elastic member in the holding portion. If a load greater than a predetermined value is inputted from behind due to, for example, a rear-end collision, a lower portion of the seat back frame is pushed by a lumbar part of a seat occupant upon a rearward movement of the seat occupant to thereby deform the elastic member, which in turn leaves the holding portion and moves rearwards along the guide portion, thus causing the seat back frame to rotate with respect to the side frame and causing the headrest to move forwards. Accordingly, the elasticity of the elastic member acts to prevent the neck of the seat occupant from being damaged. In addition, the headrest is held at a forward position by means of the elasticity of the elastic member, and when a rebound (weight shift) after the collision returns the headrest to its original position, a resistance is produced to some extent, making it possible to reduce a load on the neck.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 8A is a vertical sectional view of a portion of FIG. 7 during the normal sitting condition;

FIG. 8B is a view similar to FIG. 8A, but depicting a condition in the event of a rear-end collision;

FIGS. 15A to 15F are side views of the automobile seat of FIG. 11, depicting various inclined conditions of the seat back;

DETAILED DESCRIPTION OF THE PREFERRED EMBODIMENTS

This application is based on application Nos. 2003-349331 and 2004-245553 respectively filed Oct. 8, 2003 and Aug. 25, 2004 in Japan, the content of which is herein expressly incorporated by reference in its entirety.

Embodiment 1

Figure 1:
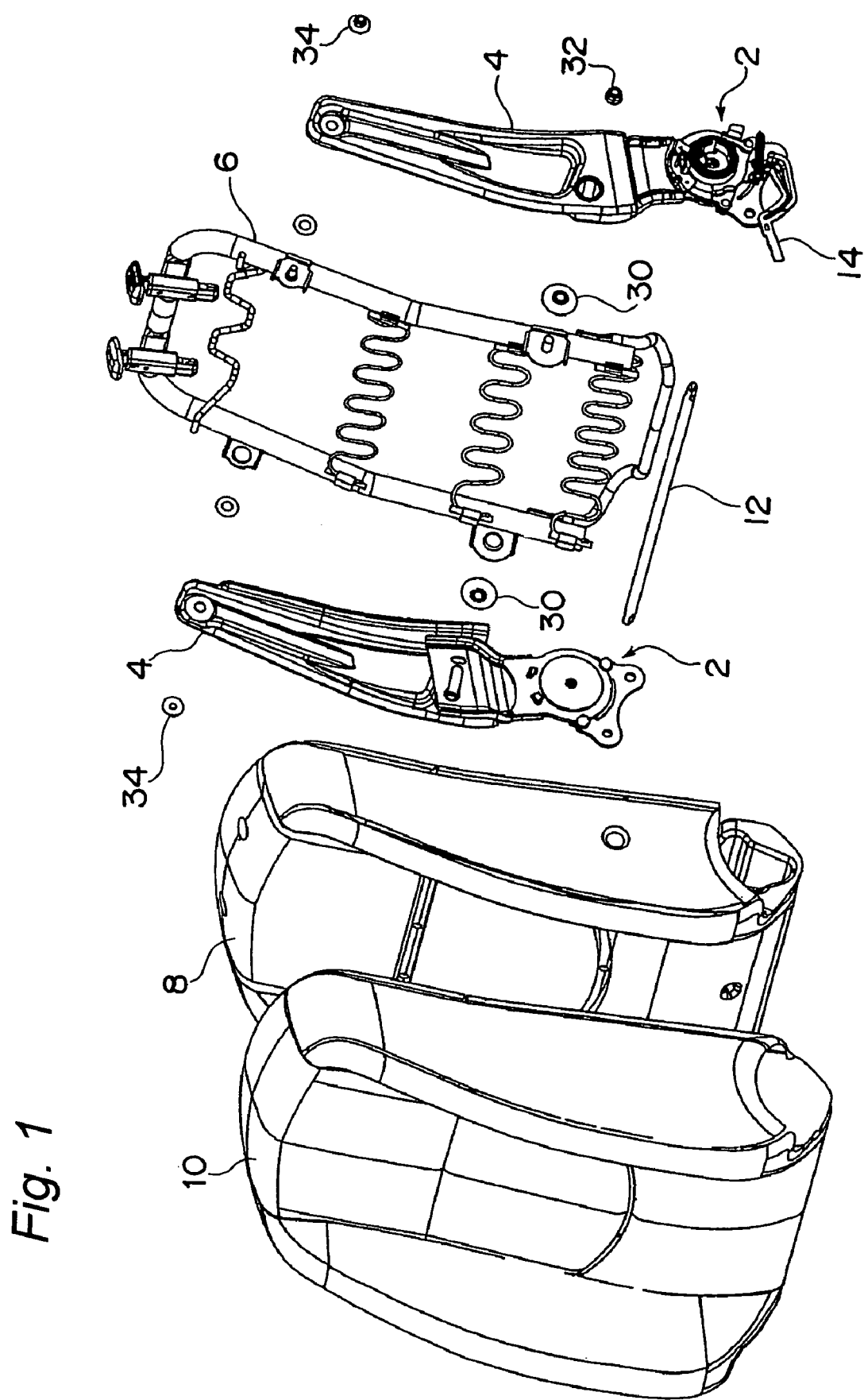
FIG. 1 is an exploded perspective view of a seat back constituting an automobile seat according to a first embodiment of the present invention.

FIG. 1 depicts a seat back of an automobile seat according to a first embodiment of the present invention, which is tiltably mounted on a seat cushion (not shown). The seat back includes a pair of side frames 4 mounted on a seat cushion frame (see FIG. 11 or 12) via respective recliner adjusters 2, a seat back frame 6 mounted on the pair of side frames 4, a pad material 8 mounted on the seat back frame 6, and a skin material 10 covered on the pad material 8. A headrest 11 (see FIG. 4) is mounted on an upper portion of the seat back frame 6.

The pair of recliner adjusters 2 are connected to each other via a connecting shaft 12. Operation of an operation lever 14 mounted on one of the recliner adjusters 2 allows the side frames 4 to be set to a desired angle.

Figure 2:
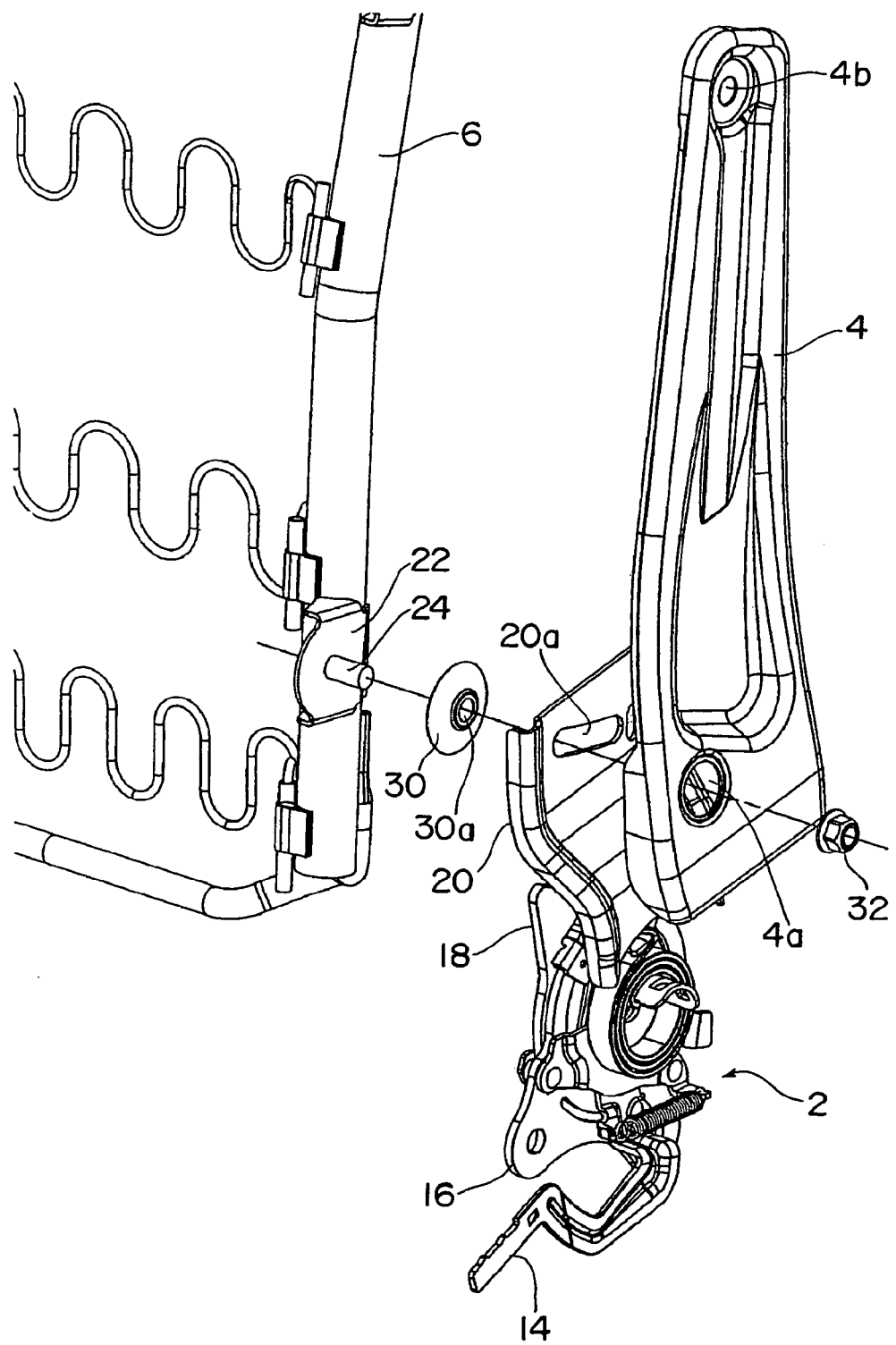
FIG. 2 is an exploded perspective view of a portion of the seat back of FIG. 1.
Figure 3:
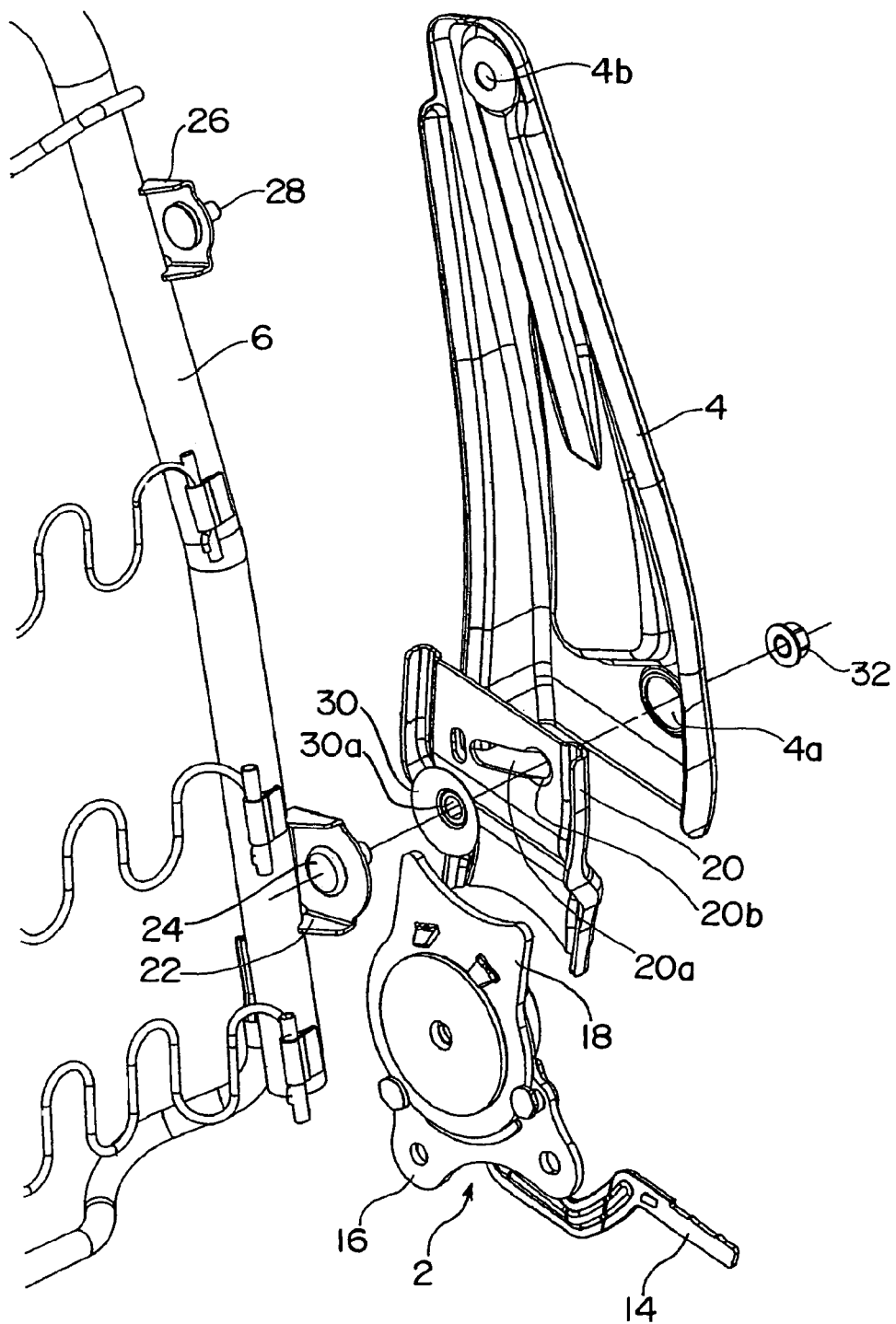
FIG. 3 is another exploded perspective view of the portion of the seat back of FIG. 1.

As shown in FIGS. 2 and 3, each of the recliner adjusters 2 includes a lower bracket 16 secured to the seat cushion frame and an upper bracket 18 rotatable relative to the lower bracket 16. Because the present invention does not aim after the recliner adjusters 2, detailed description thereof is omitted.

An inner side frame 20 is secured to the upper bracket 18 and has a guide groove (guide portion) 20a defined therein in which a bolt (explained later) secured to the seat back frame 6 is loosely inserted. The inner side frame 20 also has a recess (elastic member holder) 20b formed at a front end of the guide groove 20a for holding an elastic member (explained later). Each side frame 4 is secured to an upper portion of the inner side frame 20 and has a nut insertion hole 4a defined therein at a location confronting the recess 20b in the inner side frame 20. The side frame 4 also has a bolt insertion hole 4b formed in an upper portion thereof. The guide groove 20a referred to above is formed into an arcuated and elongated shape having a center of curvature at the bolt insertion hole 4b.

The seat back frame 6 includes a bracket 22 secured thereto at a location confronting the recess 20b in the inner side frame 20 and a first bolt 24 secured to the bracket 22 so as to protrude toward the recess 20b. The seat back frame 6 also includes another bracket 26 secured thereto at a location confronting the bolt insertion hole 4b in the side frame 4 and a second bolt 28 secured to the bracket 26 so as to protrude toward the bolt insertion hole 4b. As explained later, the second bolt 28 acts as a center of rotation about which the seat back frame 6 rotates within a limited angle.

When the seat back frame 6 is mounted on the side frame 4 and the inner side frame 20, the first bolt 24 is inserted into a center hole 30a defined in a coned disc spring 30 and into a center hole (front end of the guide groove 20a) of the recess 20b in the inner side frame 20, while the second bolt 28 is inserted into the bolt insertion hole 4b in the side frame 4. Thereafter, a first nut 32 is screwed onto the first bolt 24 through the nut insertion hole 4a in the side frame 4, while a second nut 34 is similarly screwed onto the second bolt 28.

The coned disc spring 30 is employed as an elastic member or a spring member and has an inner end protruding outwards so as to engage in a coned surface of the recess 20b that has a shape complementary to that of the inner end of the coned disc spring 30. An outer end of the coned disc spring 30 is held in contact with a planar surface of the bracket 22.

In the automobile seat of the above-described construction, the coned disc spring 30 is held in the recess 20b in the inner side frame 20 in the normal condition. Accordingly, the seat back frame 6 is fixed to the side frame 4, and the upper part of the user's body is supported by the seat back frame 6. The headrest 11 mounted on the upper portion of the seat back frame 6 is spaced a predetermined distance away from the user's head.

On the other hand, where a load greater than a predetermined value is inputted to the seat from behind in the event of, for example, a rear-end collision, the user's body is pressed to the seat back. At this moment, a rearward movement of the user's body causes the lumbar part to push a lower portion of the seat back frame 6 rearwards, and upon deformation (compression) the coned disc spring 30 leaves the recess 20b in the inner side frame 20 and moves together with the first bolt 24 toward the rear end of the guide groove 20a along the guide groove 20a. Accordingly, the seat back frame 6 rotates with the second bolt 28 as a center of rotation, and the headrest 11 moves toward the user's head to support it.

Figure 4A:
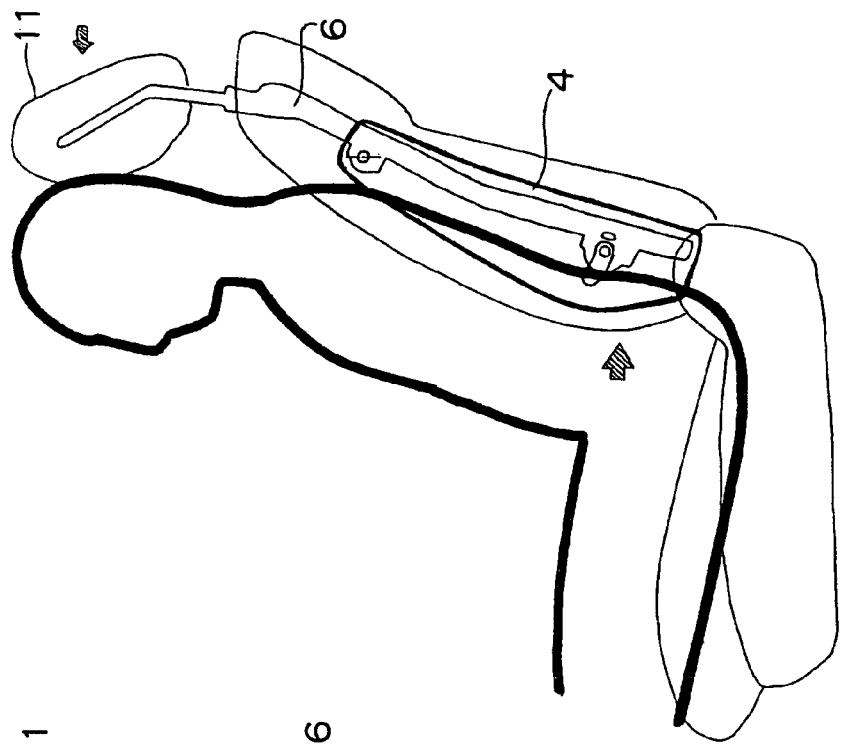
FIG. 4A is a side view of the automobile seat during the normal sitting condition.
Figure 4B:
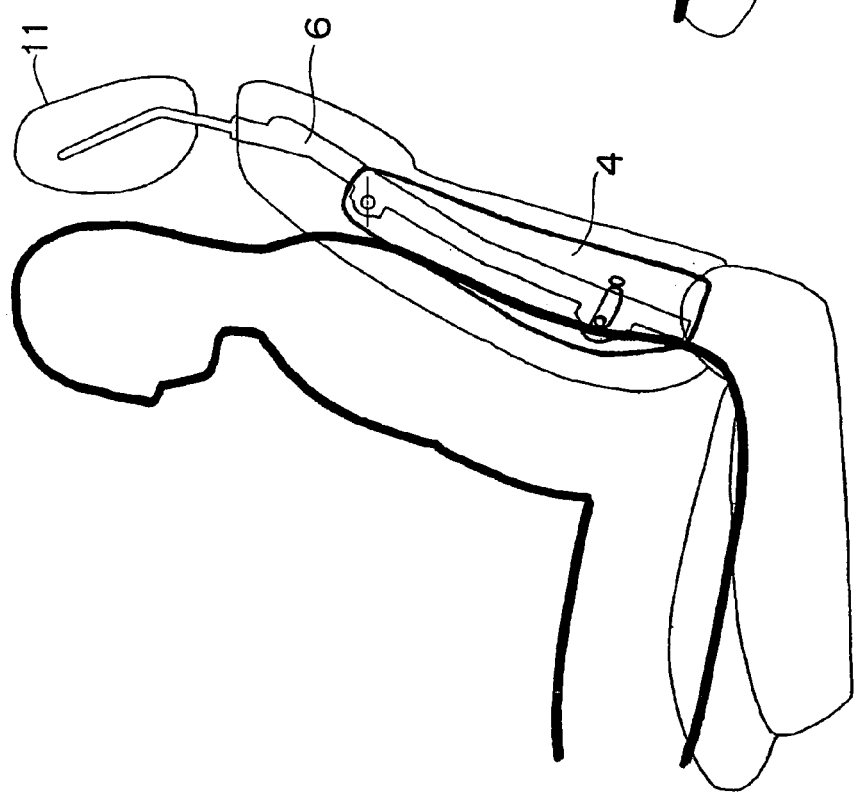
FIG. 4B is a view similar to FIG. 4A, but depicting a condition in the event of a rear-end collision.

FIG. 4A depicts the normal sitting condition, and FIG. 4b depicts a condition in the event of the rear-end collision in which the seat back frame 6 and the headrest 11 have been both shifted.

Although the distance between the first bolt 24 and the second bolt 28 is set to be greater than the distance between the second bolt 28 and the headrest 11, when a load of the user's head is applied to the headrest 11 with a delay in the event of the rear-end collision, the lumbar part is pushed back and the headrest 11 moves toward its original position. However, the deformation of the coned disc spring 30 in the event of the rear-end collision is a deformation within an elastic region and, hence, a resistance is created to some extent, making it possible to reduce the load on the user's neck.

In the case where the headrest 11 cannot return to its original position, application of a rearward load to the headrest 11 or application of a forward load to a lower portion of the seat back frame 6 causes the first bolt 24 and the coned disc spring 30 to move forwards along the guide groove 20a, and the coned disc spring 30 returns to its original position and is again held in the recess 20b.

It is to be noted here that although in the above-described embodiment the guide groove 20a is formed in the inner side frame 20, a guide groove may be formed in a portion of a side frame with which an inner side frame is integrally formed.

It is also to be noted that although in the above-described embodiment the coned disc spring 30 is employed as an elastic member, the coned disc spring may have a plurality of radially outwardly extending protrusions as explained later that are held in contact with the planar surface of the bracket 22. In this case, the protrusions deform in the event of a rear-end collision, and the coned disc spring moves along the guide groove 20a with a stable load.

It is further to be noted that a washer made of a resin or a metal and having a coned surface may be interposed as a guide member between the recess 20b and the coned disc spring 30 or the coned disc spring having the plurality of protrusions.

Figure 5:
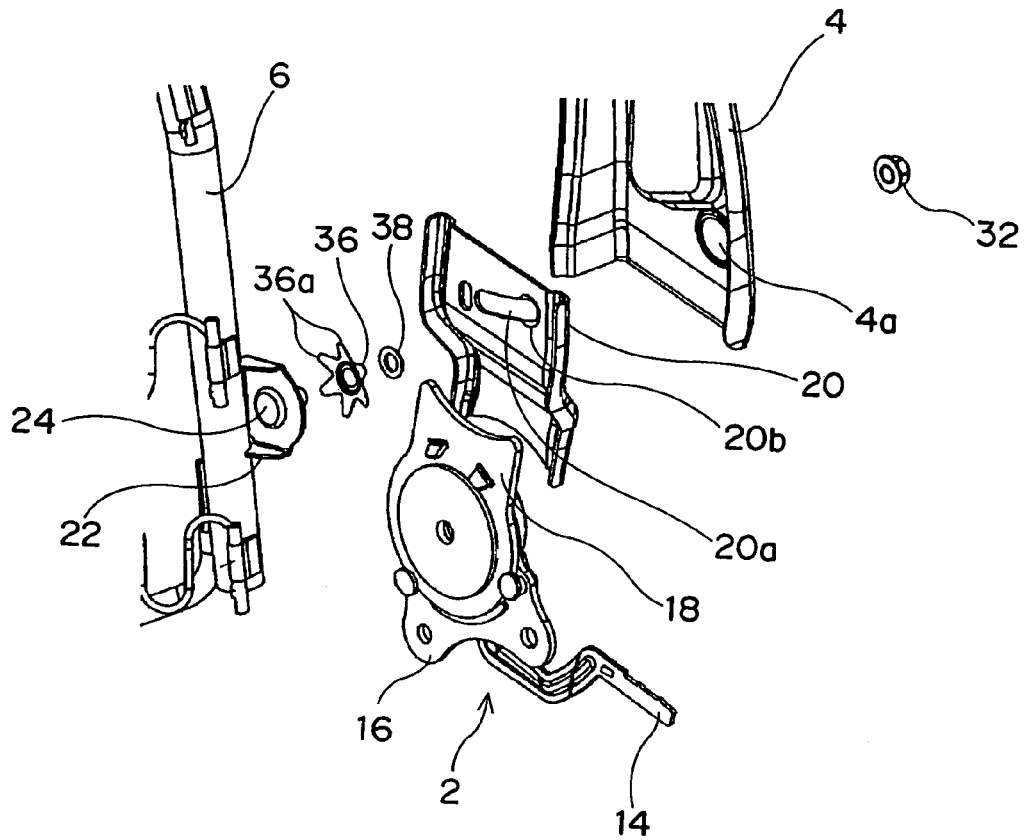
FIG. 5 is an exploded perspective view of an essential portion in a modified form of the automobile seat.
Figure 6:
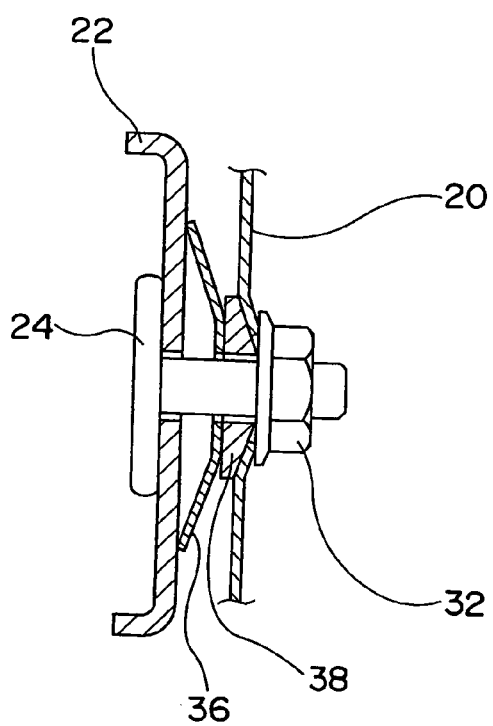
FIG. 6 is a vertical sectional view of a portion of FIG. 5.

FIGS. 5 and 6 depict such a construction wherein a washer 38 having a coned surface is interposed between the recess 20b and a coned disc spring 36 having a plurality of radially outwardly extending protrusions 36a. In this construction, the coned surface of the washer 38 engages in and is held by the recess 20b having a coned surface complementary thereto, while a planar surface of the washer 38 opposite to the coned surface is held in contact with an outer surface of the inner end of the coned disc spring 36. The plurality of protrusions 36a of the coned disc spring 36 are held in contact with the planar surface of the bracket 22.

In the construction as shown in FIGS. 5 and 6, a generally cylindrical rubber member, a compression spring, a corrugated washer, or the like can be used in place of the coned disc spring 36.

Although in the above-described embodiment the coned disc spring 30 or 36 is installed on the first bolt 24 secured to the seat back frame 6, a coned disc spring can be installed on a bolt secured to the inner side frame 20. In this case, it is sufficient if a bracket having a guide groove is secured to the seat back frame 6.

Figure 7:
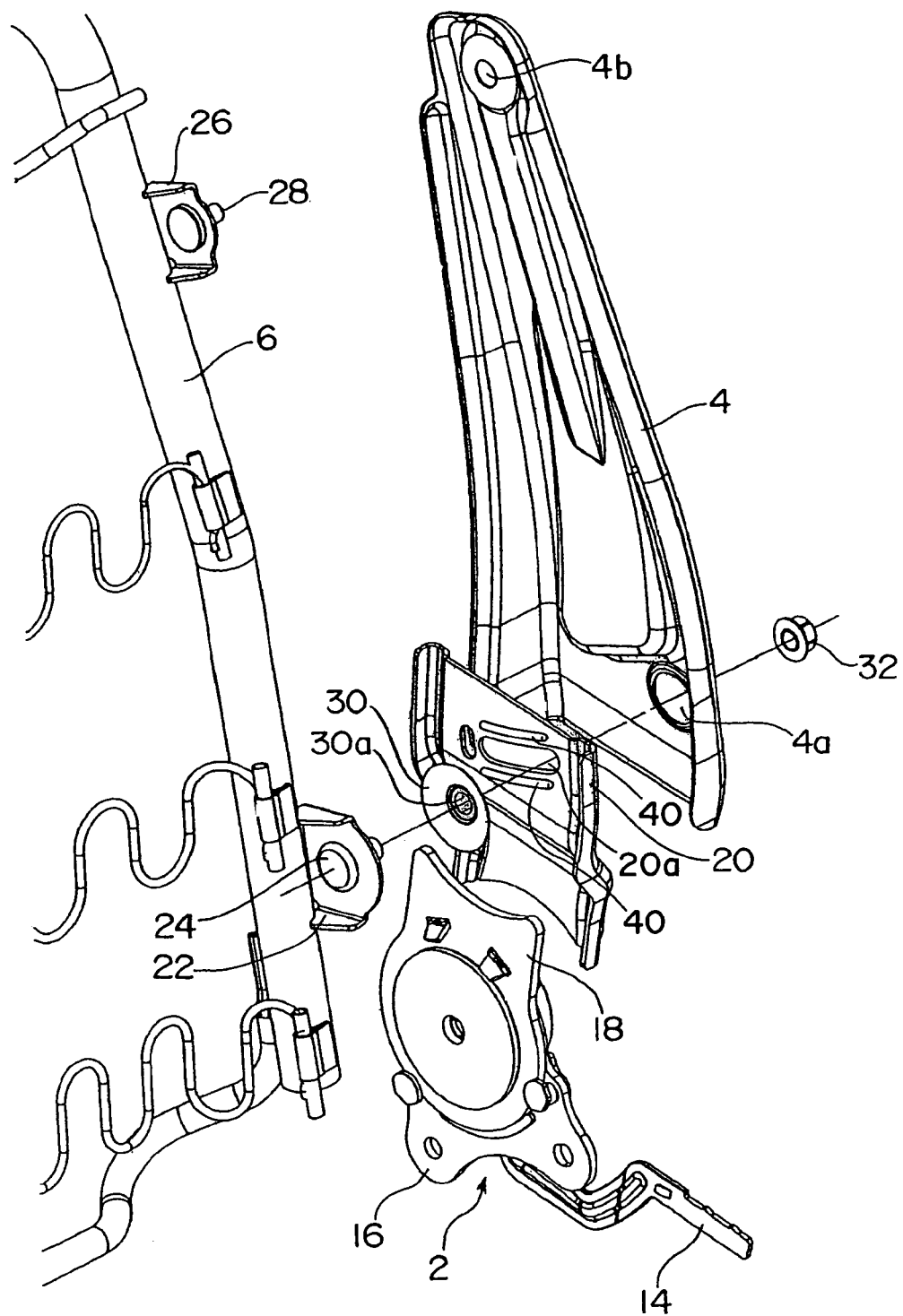
FIG. 7 is a view similar to FIG. 3, but depicting another modified form thereof.

As shown in FIG. 7 and FIGS. 8A and 8B, the inner side frame 20 may have two ridges 40 formed on respective sides of the guide groove 20a except a front end portion thereof so as to extend generally parallel to the guide groove 20a. In this case, no recess is required in the front end of the guide groove 20a to hold the coned disc spring 30 or 36.

By this construction, as shown in FIG. 8A, the coned disc spring 30 is held at the front end of the guide groove 20a in the normal condition. In the event of a rear-end collision, as shown in FIG. 8B, the coned disc spring 30 climbs up onto the ridges 40 upon deformation (compression) thereof and moves together with the first bolt 24 toward the rear end of the guide groove 20a along the guide groove 20a. Accordingly, the seat back frame 6 rotates with the second bolt 28 as a center of rotation, and the headrest 11 moves toward the users head to support it.

Figure 9:
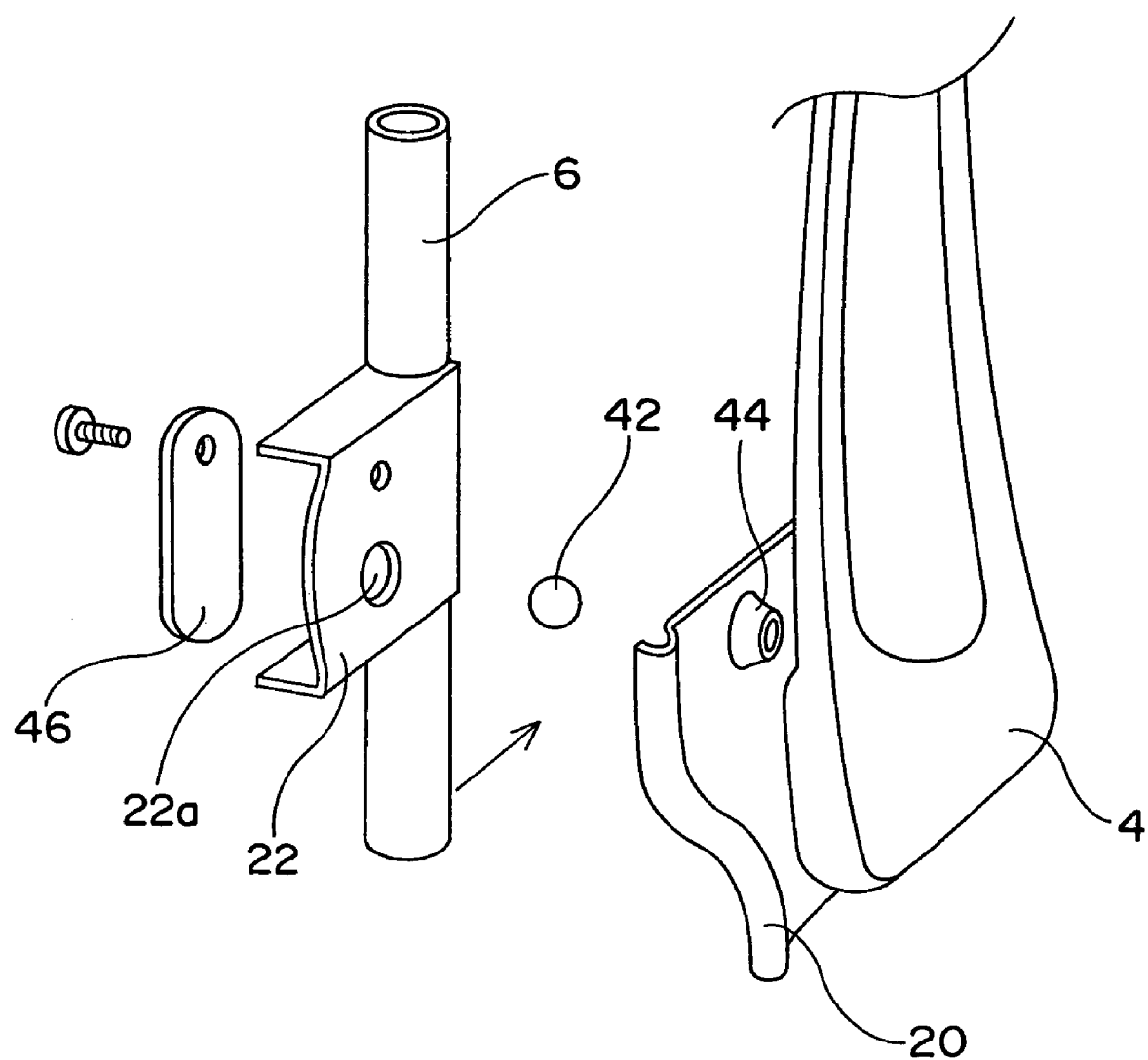
FIG. 9 is an exploded perspective view of an essential portion in a further modified form of the automobile seat.

As shown in FIG. 9, the use of a metal ball 42 is also possible to rotate the seat back frame 6 in the event of a rear-end collision.

More specifically, a lower end portion of the side frame 4 is secured to the inner side frame 20, which has a coned recess 44 defined therein so as to protrude toward the side frame 4, while a bracket 22 having a ball receiving hole 22a defined therein is secured to the seat back frame 6 so that the ball 42 may be received in the coned recess 44 in the inner side frame 20 and in the ball receiving hole 22a in the bracket 22. An elastic member 46 such as a plate spring is screwed at one end thereof to the bracket 22, and the ball 42 is pressed toward the recess 44 by the other end of the elastic member 46.

By this construction, the ball 42 is held within the recess 44 by means of an elastic force of the elastic member 46 in the normal condition. In the event of a rear-end collision, a rearward load is applied to a lower portion of the seat back frame 6 and, hence, the other end of the elastic member 46 biasing the ball 42 is lifted inwards. As a result, the ball 42 leaves the recess 44 and moves rearwards while received within the ball receiving hole 22a. Accordingly, the seat back frame 6 rotates with the second bolt 28 as a center of rotation, and the headrest 11 moves toward the user's head to support it.

Figure 10:
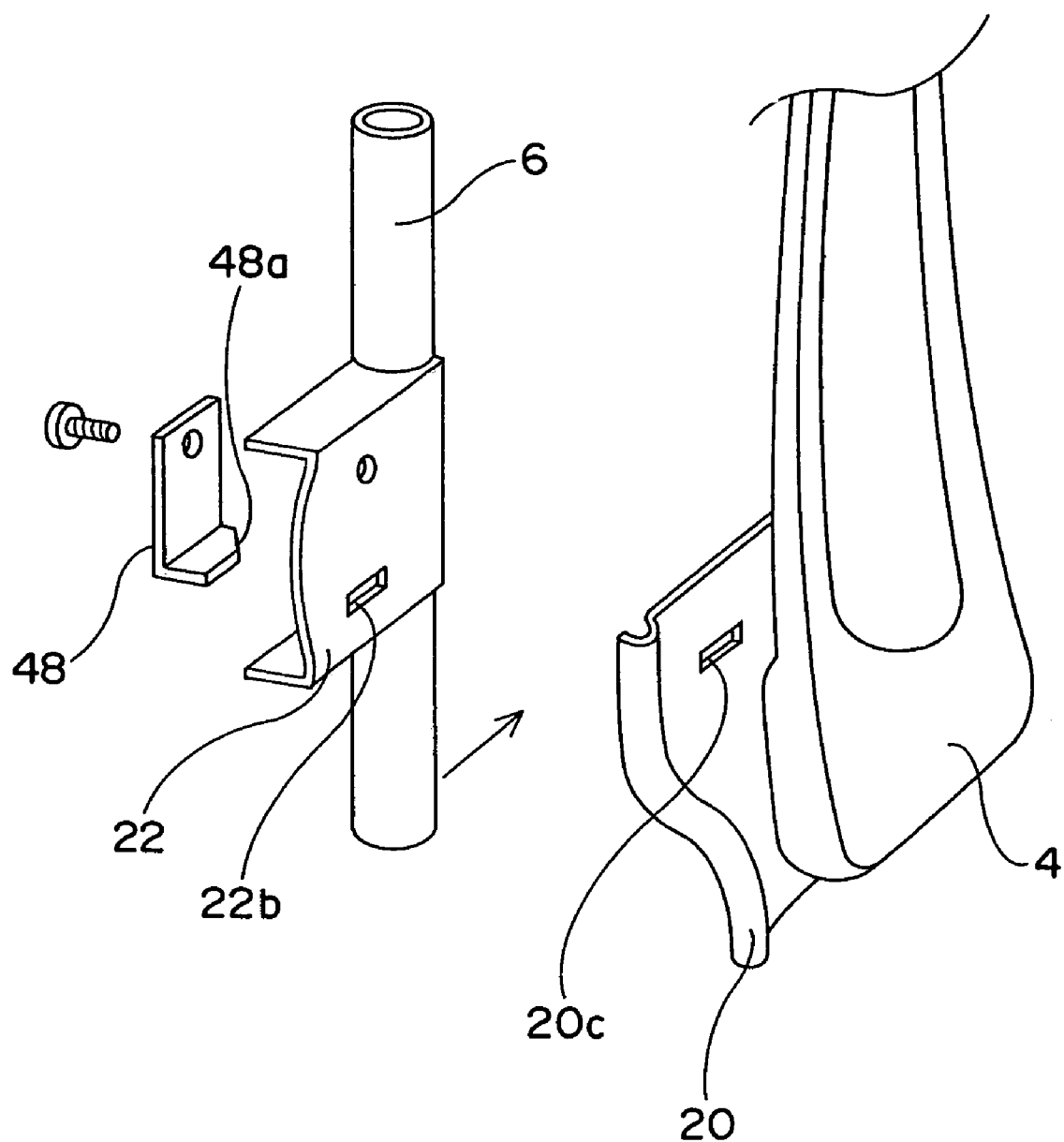
FIG. 10 is a view similar to FIG. 9, but depicting an essential portion in a still further modified form of the automobile seat.

Furthermore, a construction as shown in FIG. 10 is also possible.

More specifically, as shown in FIG. 10, a lower end portion of the side frame 4 is secured to the inner side frame 20, which has a generally horizontally extending rectangular opening 20c defined therein, while a bracket 22 similarly having a rectangular opening 22b of an identical shape is secured to the seat back frame 6 so that a distal end of an L-shaped elastic member 48 such as a plate spring that is screwed at a proximal end thereof to the bracket 22 may be loosely inserted into the two rectangular openings 20c, 22b. The elastic member 48 has a tapered cutout 48a formed at a rear portion of the distal end thereof so as to confront a rear edge of the rectangular opening 20c in the inner side frame 20.

By this construction, the distal end of the elastic member 48 is loosely inserted into and held by the two rectangular openings 20c, 22b in the normal condition. In the event of a rear-end collision, because a rearward load is applied to a lower portion of the seat back frame 6, the tapered cutout 48a of the elastic member 48 climbs up onto the rear edge of the rectangular opening 20c in the inner side frame 20 against a biasing force of the elastic member 48, and the distal end of the elastic member 48 is lifted inwards. As a result, the distal end of the elastic member 48 leaves the rectangular opening 20c and moves rearwards. Accordingly, the seat back frame 6 rotates with the second bolt 28 as a center of rotation, and the headrest 11 moves toward the user's head to support it.

Embodiment 2

Figure 11:
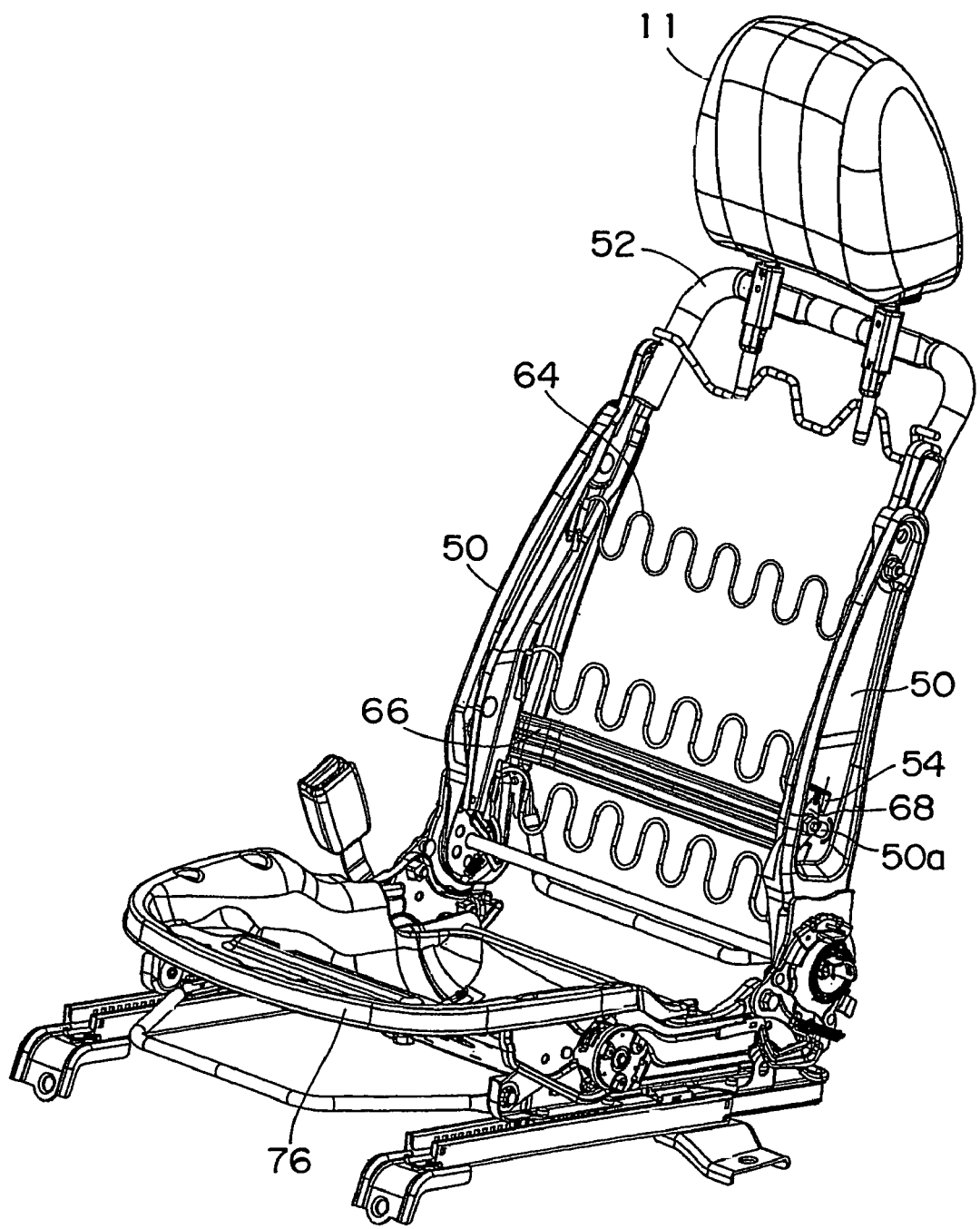
FIG. 11 is a perspective view of an automobile seat according to a second embodiment of the present invention.
Figure 12:
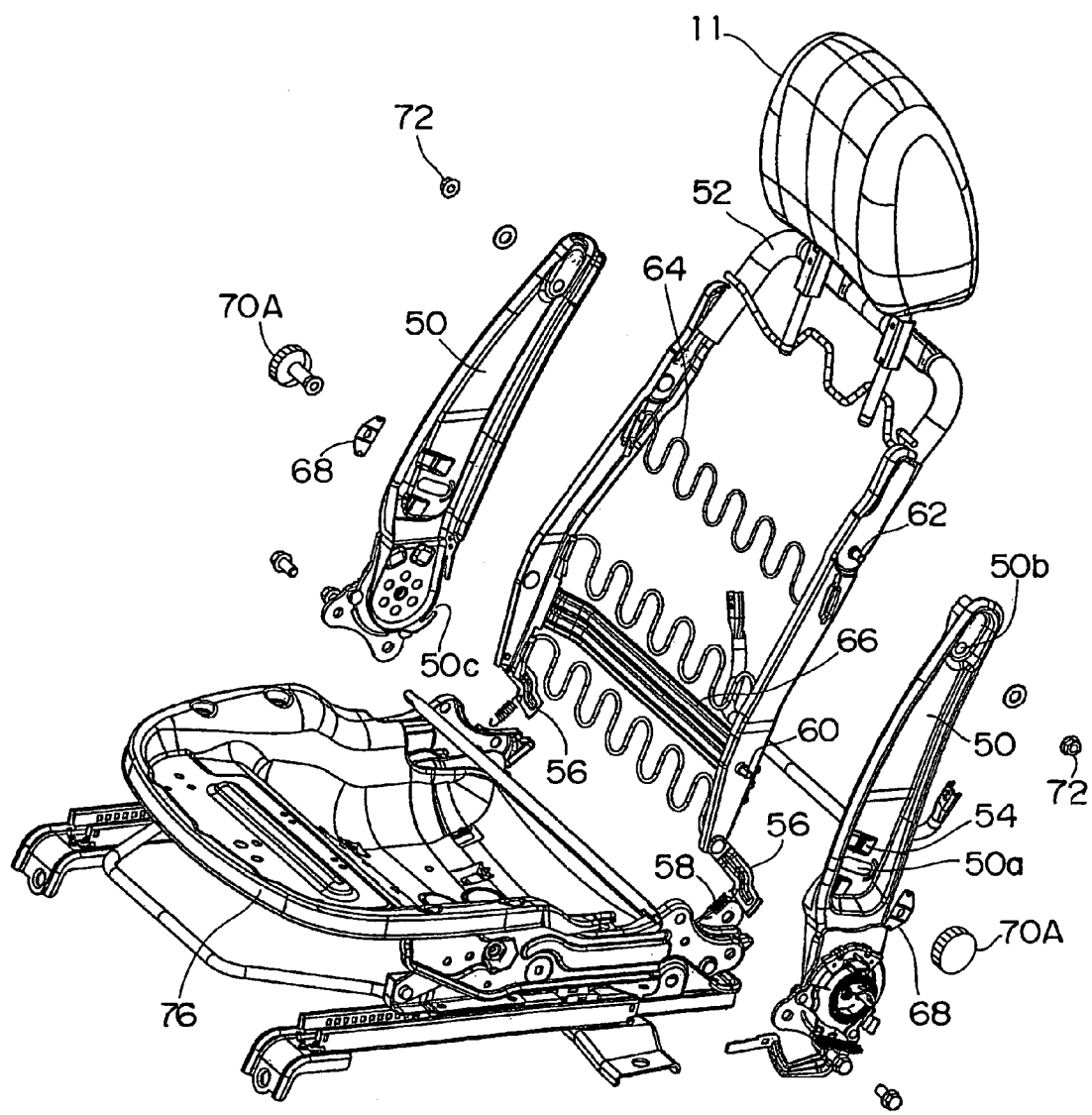
FIG. 12 is an exploded perspective view of the automobile seat of FIG. 11.

FIGS. 11 and 12 depict an automobile seat according to a second embodiment of the present invention. Only differences between the first and second embodiments are discussed hereinafter.

A side frame 50 is secured at a lower portion thereof to an upper bracket 18 of a recliner adjuster 2. The side frame 50 has a guide groove (guide portion) 50a defined therein in which a bolt (explained later) secured to a seat back frame 52 in the vicinity of a lower end thereof is loosely inserted.

Figure 13:
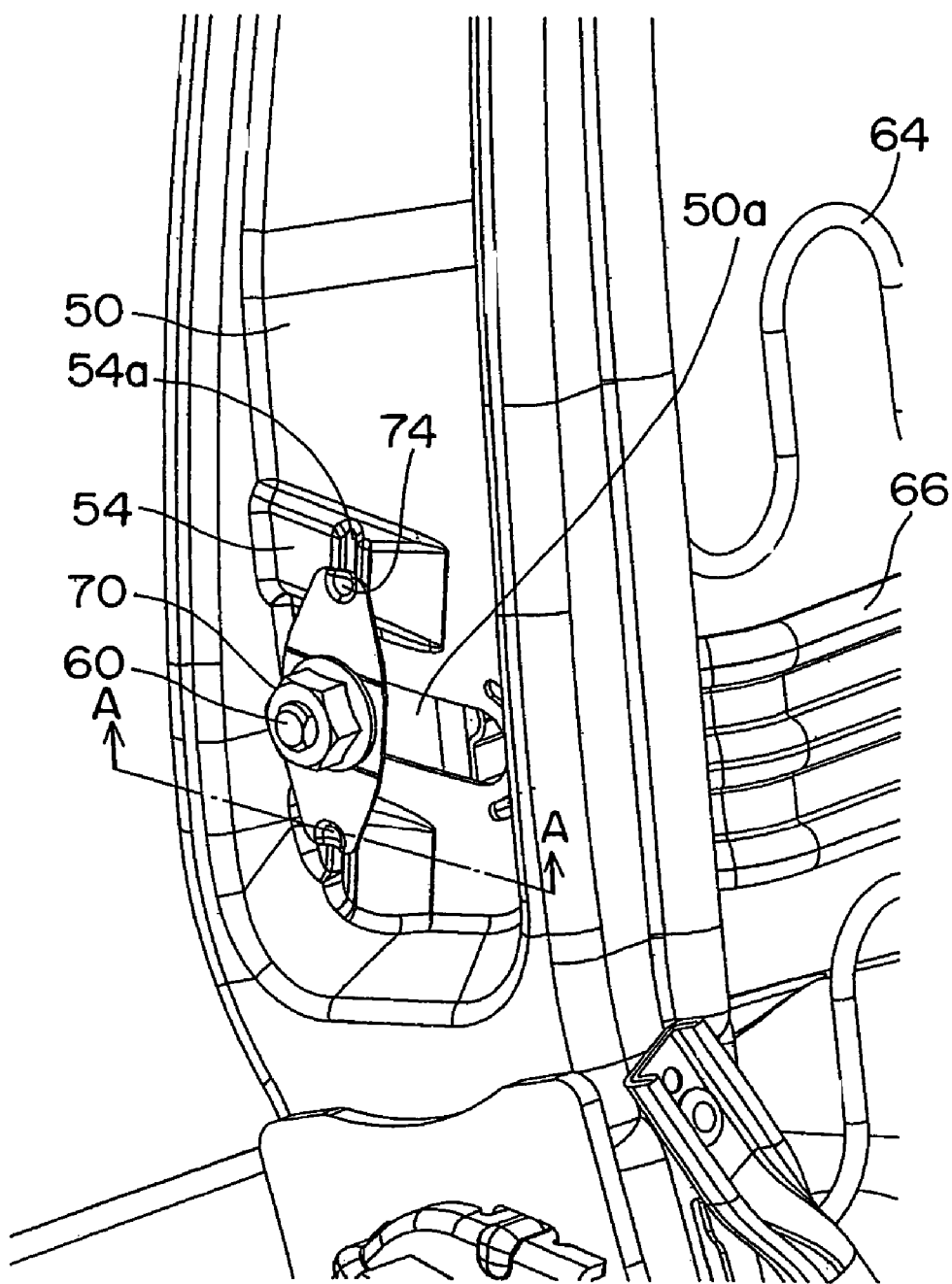
FIG. 13 is a perspective view of a portion of a seat back mounted in the automobile seat of FIG. 11.

As shown in FIG. 13, the side frame 50 has two ridges 54 formed on an outer surface thereof on respective sides of the guide groove 50a except a rear end portion thereof so as to extend generally parallel to the guide groove 50a. Each ridge 54 has a recess (elastic member holder) 54a defined at an intermediate portion thereof for holding an elastic member (explained later). The side frame 50 has a bolt insertion hole 50b defined therein at an upper portion thereof. The guide groove 50a referred to above is formed into an arcuated and elongated shape having a center of curvature at the bolt insertion hole 50b.

Figure 14:
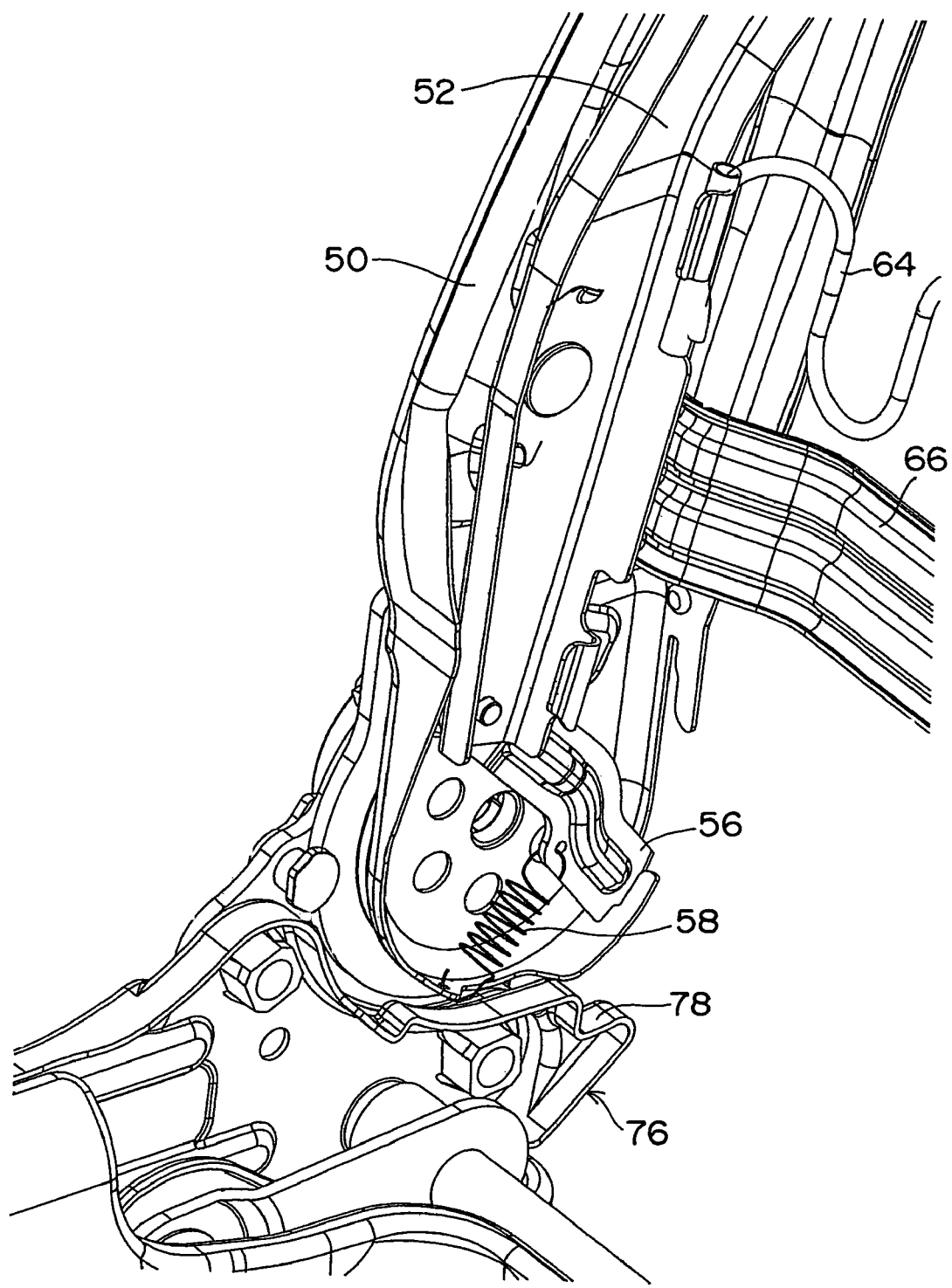
FIG. 14 is a perspective view of another portion of the seat back.

On the other hand, the seat back frame 52 having a headrest 11 mounted on an upper portion thereof is formed into an inverted "U" shape and has two lower ends positioned on respective sides thereof. As shown in FIGS. 12 and 14, each lower end of the seat back frame 52 is hingedly connected to one end of a rocking link 56, the other end of which is in turn received in a recess 50c defined in a lower portion of the side frame 50. A coil spring 58 is connected at one end thereof to an intermediate portion of the rocking link 56 and at the other end thereof to a lower portion of the side frame 50, thereby biasing the other end of the rocking link 56 toward the recess 50c.

Moreover, the seat back frame 52 includes a first bolt 60 secured thereto at a location confronting the guide groove 50a in the side frame 50 so as to protrude toward the guide groove 50a. The seat back frame 52 also includes a second bolt 62 secured thereto at a location confronting the bolt insertion hole 50b in the side frame 4 so as to protrude toward the bolt insertion hole 50b. As explained later, the second bolt 62 acts as a center of rotation about which the seat back frame 52 rotates within a limited angle.

The seat back frame 52 further includes a plurality of S-shaped springs 64 connected at opposite ends thereof to opposite side portions of the seat back frame 52, respectively. A pressure plate 66 is interposed between two S-shaped springs 64 positioned at a lower portion of the seat back frame 52 so as to confront the lumbar part of a seat occupant. As is the case with the S-shaped springs 64, the pressure plate 66 is connected at opposite ends thereof to the opposite side portions of the seat back frame 52, respectively. The S-shaped springs 64 are held in contact with a rear surface of a pad material (not shown) that is covered on the seat back frame 52, while the pressure plate 66 is spaced away from the rear surface of the pad material and is brought into contact with the pad material once the user sits on the seat.

When the seat back frame 52 is mounted on the side frame 50, the first bolt 60 is inserted into the guide groove 50a in the side frame 50 and into a center hole defined in a generally oval or rhombic elastic member 68 such as a plate spring, while the second bolt 62 is inserted into the bolt insertion hole 50b in the side frame 50. Thereafter, a first nut 70 (see FIG. 13) is screwed onto the first bolt 60, while a second nut 72 (see FIG. 14) is similarly screwed onto the second bolt 62.

The elastic member 68 has two protrusions 74 integrally formed therewith at opposite ends thereof, respectively, so as to protrude toward the side frame 50. Each protrusion 74 has a shape complementary to that of the recess 54a in the ridge 54 formed on the side frame 50, and when the first nut 70 is screwed onto the first bolt 60, the protrusion 74 engages in the recess 54a in the ridge 54. At this moment, the first bolt 60 is positioned at a front end of the guide groove 50a.

In the automobile seat of the above-described construction, each protrusion 74 of the elastic member 68 engages in and is held by the recess 54a in the ridge 54 in the normal condition. Accordingly, the seat back frame 52 is fixed to the side frames 50, and the upper part of the user's body is supported by the seat back frame 52. The headrest 11 mounted on the upper portion of the seat back frame 52 is spaced a predetermined distance away from the user's head.

On the other hand, where a load greater than a predetermined value is inputted to the seat from behind in the event of, for example, a rear-end collision, the user's body is pressed to the seat back. At this moment, a rearward movement of the user's body causes the lumbar part to push the pressure plate 66 rearwards, and upon deformation of the elastic member 68 each protrusion 74 leaves the recess 54a in the ridge 54 and moves together with the first bolt 60 toward the rear end of the guide groove 50a along the guide groove 50a. Accordingly, the seat back frame 52 rotates with the second bolt 62 as a center of rotation, and the headrest 11 moves toward the user's head to support it.

FIG. 15A depicts the normal sitting condition, and FIG. 15B depicts a condition in the event of the rear-end collision in which the seat back frame 52 and the headrest 11 have been both shifted.

Figure 16A:
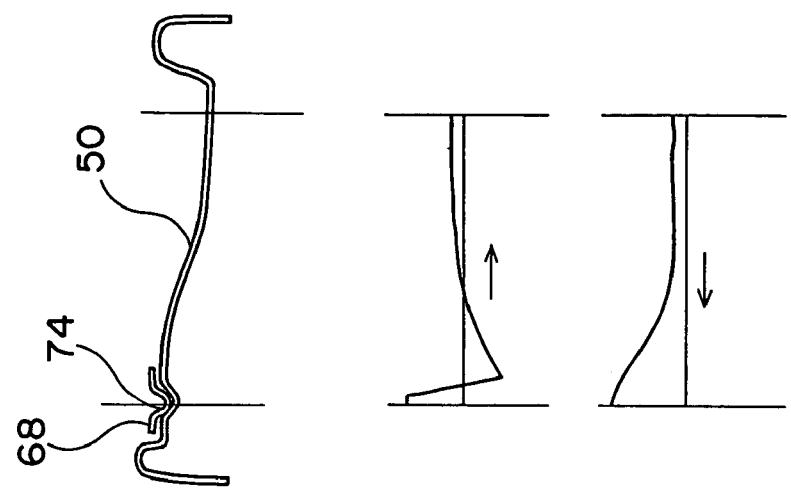
FIG. 16A is a sectional view taken along line A—A in FIG. 13 to which two graphs are attached indicating a load during a forward movement of a headrest and a load during return thereof to its original position, respectively.

As shown in FIG. 16A, because each ridge 54 slopes gently down rearwards, the elastic member 68 can easily move rearwards during operation (during a forward movement of the headrest 11), and when the headrest 11 returns to its original position, the slope of the ridge 54 acts to provide a resistance to some extent.

Rear-end collision tests carried out up to this time revealed that a load applied to the human body is high at the lumbar part first and then becomes high at the chest and at the head. According to the present invention, once the load applied to the lumbar part becomes high, the rocking mechanism of the seat back frame 52 acts to first move the headrest 11 forwards to support the head. Thereafter, when the load applied to the chest or the head becomes high, the elastic member 68 returns to its original position, while absorbing a shock applied to the chest or the head by the action of the slope of the ridge 54 referred to above (rebound).

Figure 16B:
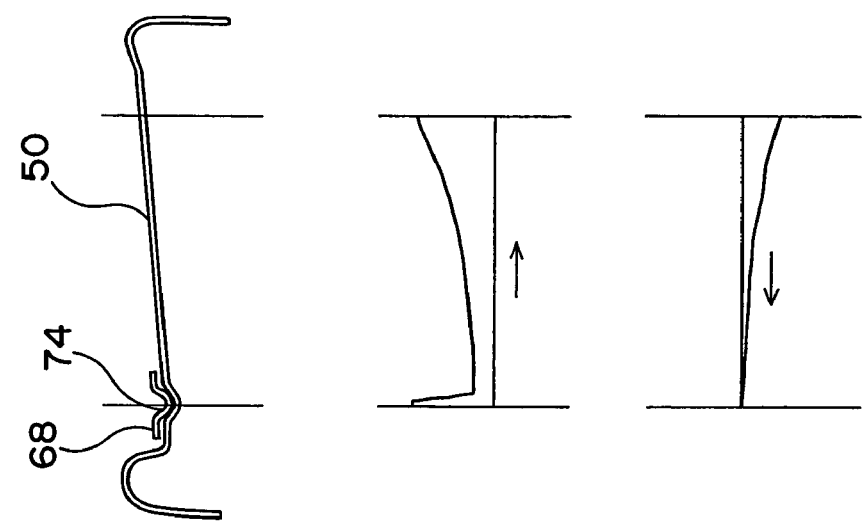
FIG. 16B is a view similar to FIG. 16A, depicting a modification thereof.
Figure 16C:
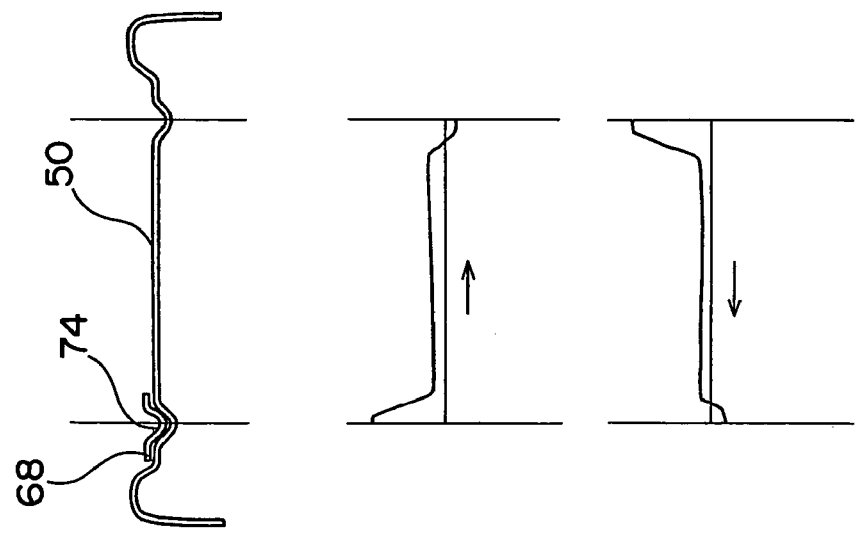
FIG. 16C is a view similar to FIG. 16A, depicting another modification thereof.

It is to be noted here that the recess 54a in which the protrusion 74 of the elastic member 68 engages is not necessarily formed in the ridge 54, and it may be formed in the side frame 50, as shown in FIG. 16B or 16C, in which the side frame 50 is so formed as to slope gently up rearwards or to be generally flat. By so doing, the resistance during a forward movement of the headrest 11 or during its return to the original position can be changed. In FIGS. 16A to 16C, middle and lower graphs respectively indicate the loads during the forward movement of the headrest 11 and during its return to the original position.

The load at the time when the protrusion 74 of the elastic member 68 leaves the recess 54a in the ridge 74 can be changed by the nut 70 as shown in FIG. 13. In FIG. 12, an adjusting dial 70A with a nut is illustrated in place of the nut 70. The load at the time when the protrusion 74 leaves the recess 54a can be changed by changing a tightening force of the nut 70 or adjusting dial 70A with respect to the first bolt 60.

In the first embodiment, when the seat back is greatly tilted rearwards and a large load (for example, the weight of the seat occupant) is applied to a portion thereof with which the lumbar part of the seat occupant is held in contact during the normal sitting condition, there is a good chance that the rocking mechanism of the seat back frame 52 works. In this embodiment, however, the rocking mechanism of the seat back frame does not work when the seat back is tilted rearwards.

More specifically, when the seat back is tilted rearwards from the sitting condition shown in FIG. 15A to a condition shown in FIG. 15C, the rocking link 56 hingedly connected to the lower portion of the seat back frame 52 is brought at the lower end thereof into contact with a stepped portion 78 formed at a rear portion of the seat cushion frame 76. Thereafter, when the seat back is further tilted rearwards, the lower end of the rocking link 56 leaves the recess 50c in the lower portion of the side frame 50 while being kept in contact with the stepped portion 78, maintaining the lower end of the seat back frame 52 at a predetermined level, as shown in FIGS. 15D to 15F. Accordingly, even if the weight of the seat occupant is applied to the pressure plate 66 in the condition as shown in, for example, FIG. 15F, the connecting portion between the seat back frame 52 and the rocking link 56 is maintained at the predetermined level while being supported by the rocking link 56 and, hence, the protrusion 74 of the elastic member 68 does not leave the recess 54a in the ridge 54.

After the protrusion 74 of the elastic member 68 has left the recess 54a in the ridge in the event of a rear-end collision, even if a subsequent rebound does not return the elastic member 68 to its original position, a rearward tilt of the seat back to a condition as shown in FIG. 15F gradually lifts the lower end of the seat back frame 52 by the action of the rocking link 56, resulting in the elastic member 68 returning to its original position. That is, the rocking link 56 acts as a means for returning the rocking mechanism of the seat back frame 52 or a means for preventing the rocking mechanism from operating during a rearward tilt of the seat back. This means can be applied to the first embodiment.

Furthermore, the pressure plate 66 to which the load resulting from a movement of the seat occupant is applied in the event of a rear-end collision can be similarly applied to the first embodiment.

Although the automobile seat according to the present invention has a simple construction in which an elastic member is mounted on one of the seat back frame and each side frame, while a guide portion for guiding the elastic member is formed in the other of the seat back frame and each side frame, the head of the seat occupant can be supported by moving the headrest forwards in the event of a rear-end collision, and the headrest is allowed to subsequently move to its original position with a resistance, making it possible to prevent the seat occupant from suffering a whiplash injury.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile seat comprising:
   a seat cushion frame arranged to have a seat cushion mounted thereon;
   a side frame mounted on said seat cushion frame;
   a seat back frame arranged to have a seat back mounted thereon, said seat back frame having an upper portion and a lower portion, said upper portion being arranged to have a head rest mounted thereon, said seat back frame being mounted on said side frame so as to be rotatable relative thereto within a limited range about a center of rotation disposed on said side frame;
   an elastic member mounted on one of said side frame and said seat back frame; and
   a guide portion and a holding portion provided on the other of said side frame and said seat back frame;
   wherein said holding portion is arranged to normally hold said elastic member in a forward position and to allow said elastic member to deform and thereby leave said holding portion when a load greater than a predetermined value is inputted from behind such that said lower portion of seat back frame is pushed rearwardly by a lumbar part of a seat occupant upon rearward movement of the seat occupant;
   wherein said guide portion is arranged to guide said elastic member rearwardly when said elastic member leaves said holding portion upon said lower portion of said seat back frame being pushed rearwardly so as to pivot about said center of rotation, to thereby cause said upper portion of said seat back frame to move forward;
   wherein said elastic member comprises a spring member, and said holding portion has a shape complementary to a shape of a portion of said spring member that is held by said holding portion;
   wherein said guide portion is provided on said side frame, and said spring member is mounted on said lower portion of said seat back frame; and
   wherein said guide portion comprises a guide groove formed in said side frame and two ridges formed on respective sides of said guide groove, while said holding portion comprises two recesses formed on respective sides of said guide groove, and wherein said elastic member has two protrusions formed therewith that engage in said two recesses, respectively.

2. The automobile seat according to claim 1, wherein a load at a time when said elastic member begins to move rearwards from said holding portion is adjustable.

3. An automobile seat comprising;

a seat cushion frame arranged to have a seat cushion mounted thereon;

a side frame mounted on said seat cushion frame;

a seat back frame arranged to have a seat back mounted thereon, said seat back frame having an upper portion and a lower portion, said upper portion being arranged to have a head rest mounted thereon, said seat back frame being mounted on said side frame so as to be rotatable relative thereto within a limited range about a center of rotation;

an elastic member mounted on one of said side frame and said seat back frame; and a guide portion and a holding portion provided on the other of said side frame and said seat back frame;

wherein said holding portion is arranged to normally hold said elastic member in a forward position and to cause said elastic member to elastically deform and thereby leave said holding portion when a load greater than a predetermined value is inputted from behind such that said lower portion of seat back frame is pushed rearwardly by a lumbar part of a seat occupant upon rearward movement of the seat occupant;

wherein said guide portion is arranged to guide said elastic member rearwardly when said elastic member leaves said holding portion upon said lower portion of said seat back frame being pushed rearwardly so as to pivot about said center of rotation, to thereby cause said upper portion of said seat back frame to move forward;

wherein said elastic member comprises a spring member, and said holding portion has a shape complementary to a shape of a portion of said spring member that is held by said holding portion;

wherein said guide portion is provided on said side frame, and said spring member is mounted on said lower portion of said seat back frame; and wherein said guide portion comprises a guide groove formed in said side frame and two ridges formed on respective sides of said guide groove, while said holding portion comprises two recesses formed on respective sides of said guide groove, and wherein said elastic member has two protrusions formed therewith that engage in said two recesses, respectively.

* * * * *